US007472583B2

(12) United States Patent
Kato et al.

(10) Patent No.: US 7,472,583 B2
(45) Date of Patent: Jan. 6, 2009

(54) EVAPORATED FUEL LEAKAGE DETECTOR FOR USE IN AUTOMOTIVE VEHICLE

(75) Inventors: Yasuo Kato, Niwa-gun (JP); Masao Kano, Gamagori (JP); Hitosi Amano, Okazaki (JP); Seiji Kunihiro, Kariya (JP)

(73) Assignee: Denso Corporation (JP)

( * ) Notice: Subject to any disclaimer, the term of this patent is extended or adjusted under 35 U.S.C. 154(b) by 256 days.

(21) Appl. No.: 11/496,489

(22) Filed: Aug. 1, 2006

(65) Prior Publication Data

US 2007/0051168 A1 Mar. 8, 2007

(30) Foreign Application Priority Data

Sep. 8, 2005 (JP) ............................. 2005-260677

(51) Int. Cl.
*G01M 3/04* (2006.01)

(52) U.S. Cl. ........................................ 73/49.7; 73/49.2

(58) Field of Classification Search .................. 73/49.7, 73/114.39, 118.1
See application file for complete search history.

(56) References Cited

U.S. PATENT DOCUMENTS 7,004,013 B2 2/2006 Kobayashi et al.
2004/0149016 A1 * 8/2004 Kano et al. .................... 73/40
2005/0044936 A1 3/2005 Kobayashi et al.

* cited by examiner

*Primary Examiner*—Hezron Williams
*Assistant Examiner*—Mark Shabman
(74) *Attorney, Agent, or Firm*—Nixon & Vanderhye PC

(57) ABSTRACT

A detector for detecting evaporated fuel leakage from a fuel tank is connected to the fuel tank through a canister for absorbing evaporated fuel. When an engine is not in operation, air in the fuel tank is sucked by a pump installed in the detector. If the pressure in the fuel tank decreases to a predetermined level, it is determined that the evaporated fuel leakage is within a permissible range. An orifice passage, formed in the detector, connecting a tank passage to a sensor passage communicating with a sensor chamber where a pressure sensor is disposed is slanted relative to the tank passage to shorten the passage distance up to the pressure sensor. Further, the orifice passage is connected to the sensor passage at an obtuse angle to reduce a pressure loss in the passages. Thus, the leakage of the evaporated fuel is surely detected while making the detector compact.

3 Claims, 4 Drawing Sheets

EVADORATED FUEL LEAKAGE DETECTOR FOR USE IN AUTOMOTIVE VEHICLE

CROSS-REFERENCE TO RELATED APPLICATION

This application is based upon and claims benefit of priority of Japanese Patent Application No. 2005-260677 filed on Sep. 8, 2005, the content of which is incorporated herein by reference.

BACKGROUND OF THE INVENTION

1. Field of the Invention

The present invention relates to a device for detecting leakage of evaporated fuel in a fuel tank of an automotive vehicle.

2. Description of Related Art

Evaporated fuel leakage from a fuel tank is usually detected by detecting pressure changes in a conduit connected to the fuel tank after the fuel tank is pressurized or de-pressurized. Since, if evaporated fuel leaks together with air from the fuel tank, the pressure in the conduit connected to the fuel tank changes, the evaporated fuel leakage is detected based on pressure changes in the conduit connected to the fuel tank. An example of the leakage detector of this kind is disclosed in JP-A-2005-069102.

In the leakage detector disclosed in JP-A-2005-069102, the conduit connected to the fuel tank and a pump for pressurizing or de-pressurizing the fuel tank are connected by a pump passage that is vertically branched out from a tank passage. A sensor passage connected to a sensor chamber in which a pressure sensor is disposed is further branched out vertically from the pump passage. Therefore, a total length of the passage from the tank passage to the sensor chamber becomes long. The sensor chamber is also connected, via the pump passage, to an orifice passage where a reference orifice is disposed. Accordingly, a distance from the orifice to the sensor chamber becomes long, and there is a possibility that a difference occurs between pressures at the orifice and in the sensor chamber. Since the pump passage is disposed vertically to the tank passage and the sensor passage, a space for making the pump passage has to be secured in the detector device. Therefore, the detector device becomes large in size. Further, since one end of the pump passage opposite to the tank passage has to be closed with a stopper or the like, the number of the parts forming the detector device increases.

SUMMARY OF THE INVENTION

The present invention has been made in view of the above-mentioned problem, and an object of the present invention is to provide an improved detector device for detecting evaporated fuel leakage from a fuel tank, in which the leakage is surely detected while making the device compact.

A fuel tank of an automotive vehicle is connected to a canister that absorbs fuel evaporated from the fuel tank. A detector for detecting evaporated fuel leakage from the fuel tank is connected to the canister. When an engine is not operated, air in the canister, after the evaporated fuel is absorbed, is open to the atmosphere through the detector. The evaporated fuel absorbed to the canister is purged into the engine when the engine is operated.

The detector connected to the canister includes a pump for pressurizing or depressurizing the fuel tank and a pressure sensor for detecting pressure in the fuel tank. The pump and the pressure sensor are contained in a housing, in which a tank passage connected to the canister, a sensor passage for leading air from the tank passage to a sensor chamber, and an orifice passage connecting the tank passage to the sensor passage are formed. An orifice having an opening corresponding to an amount of permissible leakage from the fuel tank is disposed in the orifice passage. The orifice passage formed in the housing is inclined with respect to the tank passage. The orifice passage is connected to the sensor passage, forming an obtuse angle therebetween. The tank passage and the sensor passage are substantially in parallel to each other.

A process of detecting evaporated fuel leakage from the fuel tank is performed when a predetermined time lapsed after the engine is stopped. In the detecting process, a reference pressure which appears in the sensor chamber by sucking outside air by the pump through the orifice is detected. Then, the pump is temporarily stopped to recover the atmospheric pressure in the sensor chamber. Then, the pump is operated again to suck air in the fuel tank through the canister, and the pressure in the sensor chamber that represents a pressure in the fuel tank is detected. If the pressure in the fuel tank decreases at least to the level of the reference pressure, it is determined that the evaporated fuel leakage from the fuel tank is within a permissible range. That is, it is determined that air-tightness of the fuel tank is sufficient.

Since the orifice passage is inclined relative to the tank passage, a distance from the tank passage to the sensor chamber is shortened. Since the orifice passage is connected to the sensor passage at an obtuse angle, a pressure loss in a passage composed of the orifice passage and the sensor passage is lowered. Because of the passage structures according to the present invention, the evaporated fuel leakage is detected with high accuracy while making the detector compact. Other objects and features of the present invention will become more readily apparent from a better understanding of the preferred embodiment described below with reference to the following drawings.

DETAILED DESCRIPTION OF THE PREFERRED EMBODIMENT

Figure 1:
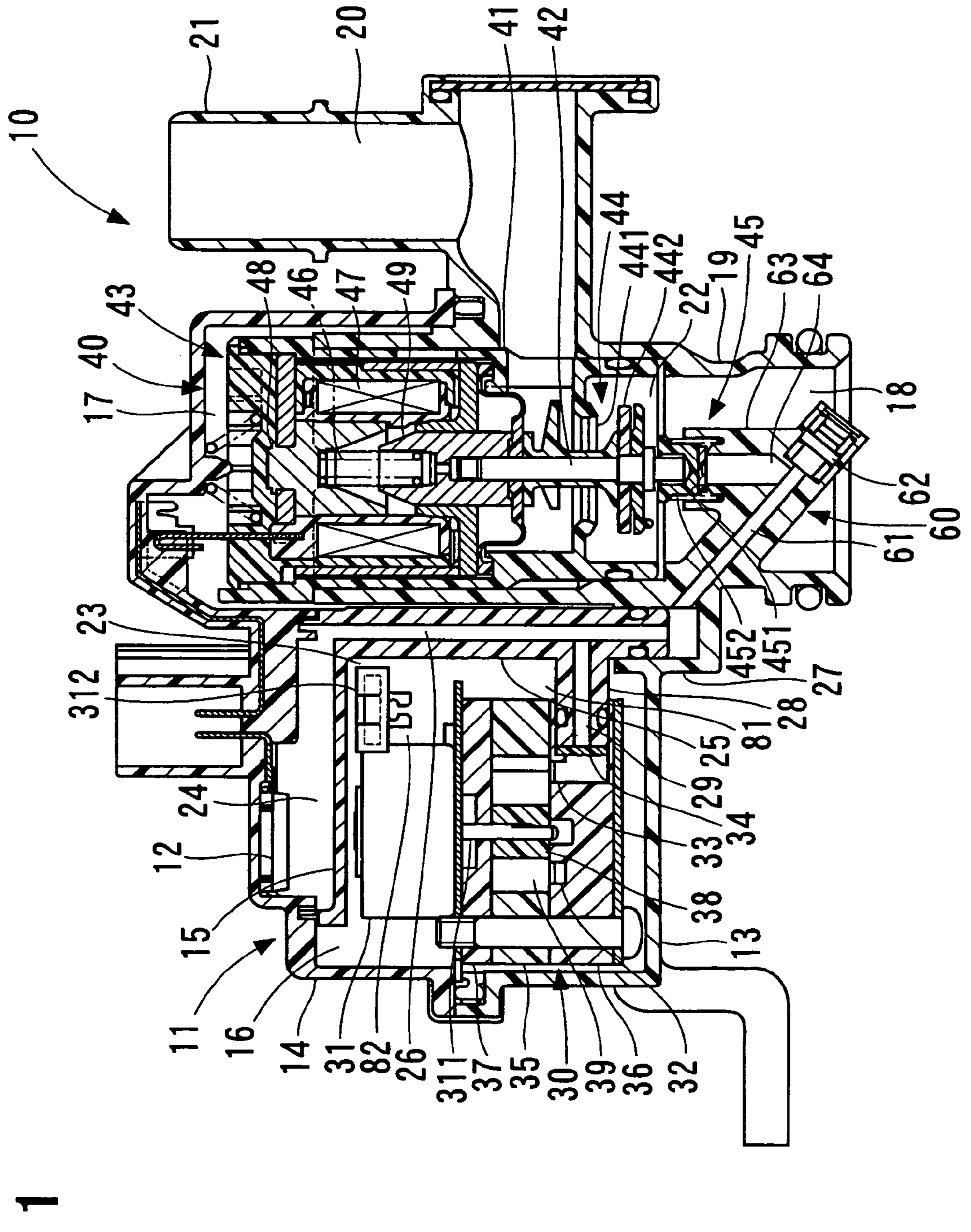
FIG. 1 is a cross-sectional view showing a detector for detecting evaporated fuel leakage from a fuel tank according to the present invention.

A preferred embodiment of the present invention will be described with reference to accompanying drawings. As shown in FIG. 1, a detector 10 for detecting evaporated fuel leakage from the fuel tank according to the present invention includes a housing 11, a pump 30, a motor 31, a switching valve 40, and a pressure sensor 12. The detector 10 is positioned upward of a fuel tank 2 and a canister 3 in the gravity direction to prevent liquid fuel and water from entering into the detector 10 from the fuel tank and the canister.

Figure 2:
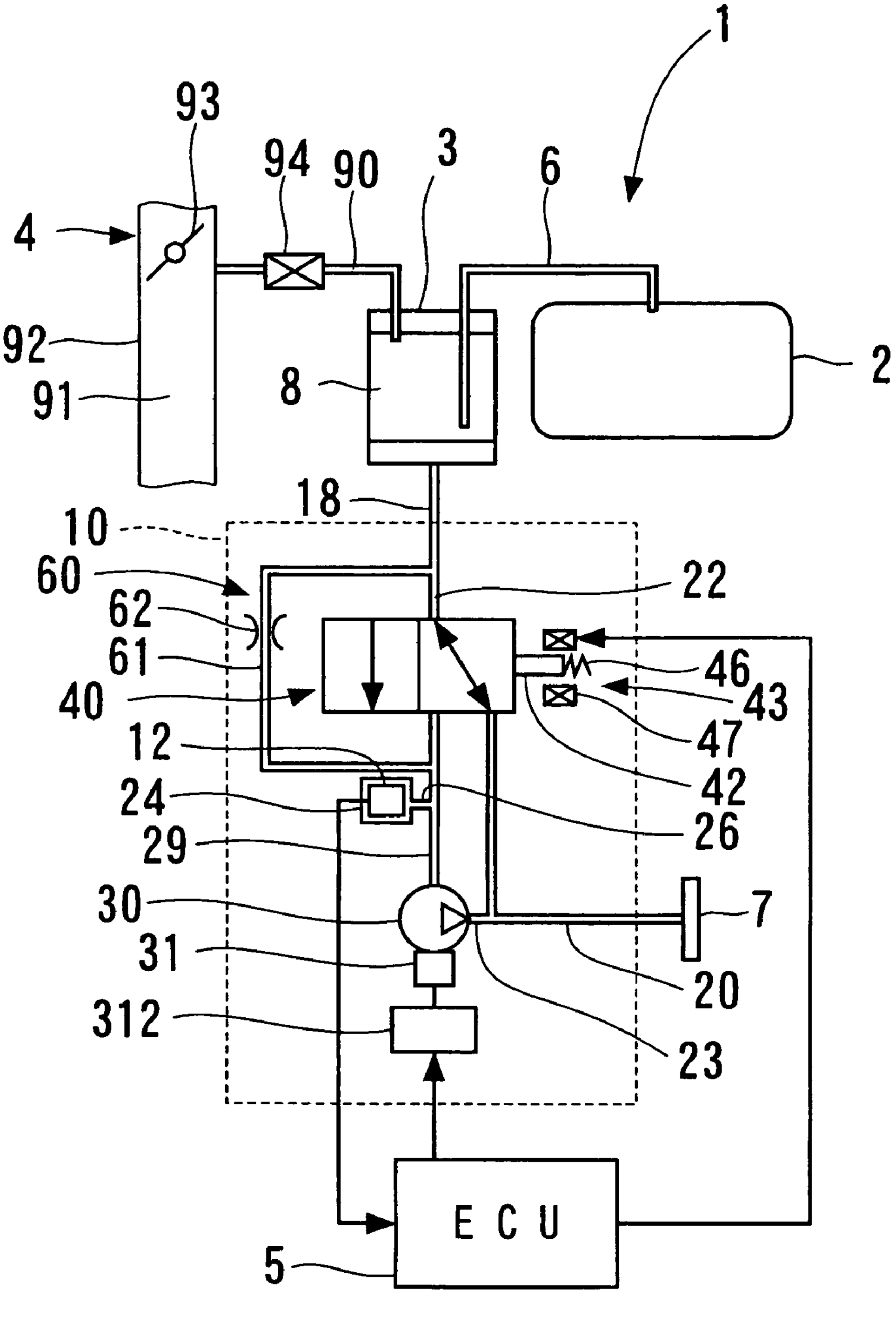
FIG. 2 is a block diagram showing a system for detecting evaporated fuel leakage from a fuel tank.
Figure 3:
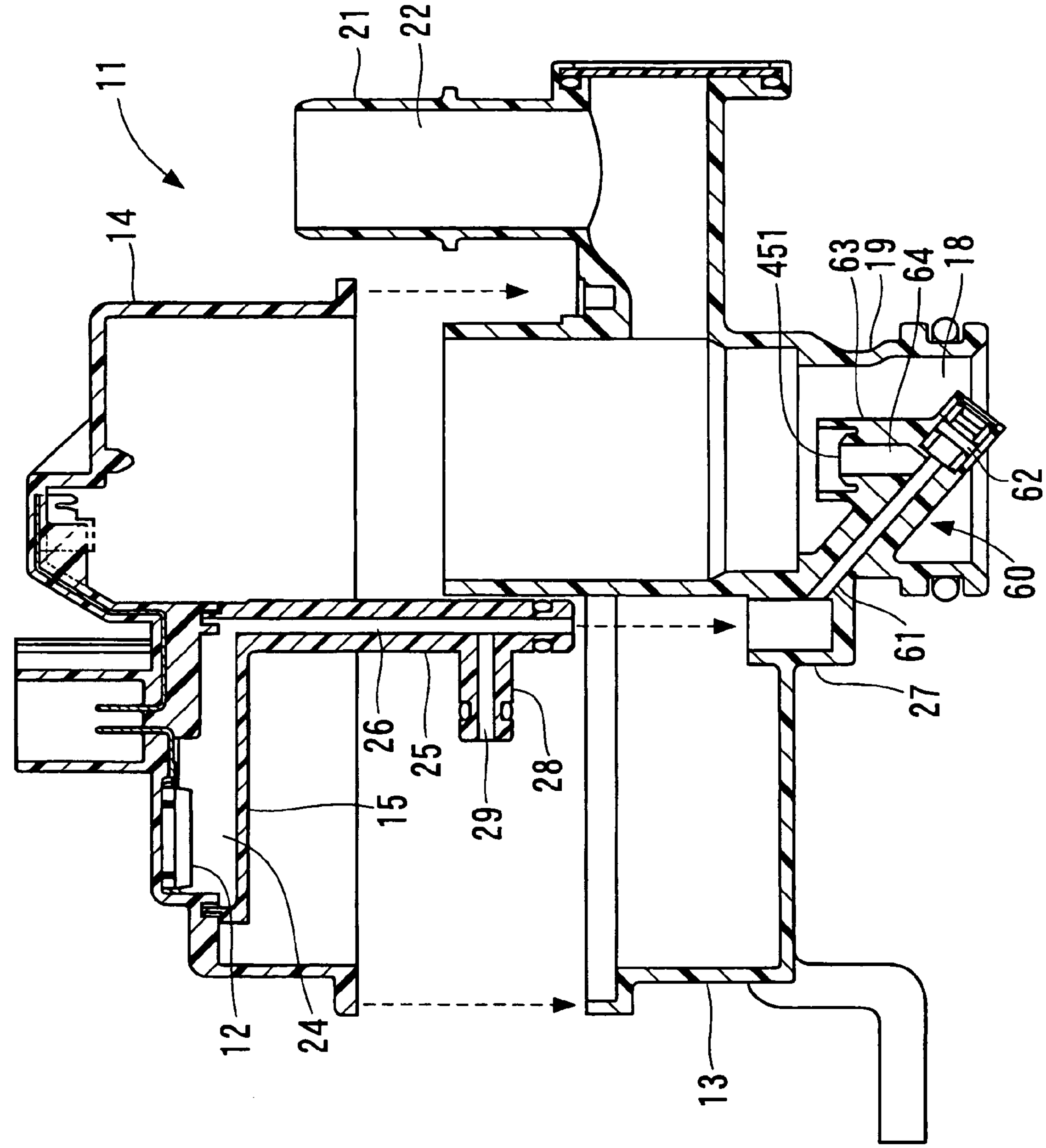
FIG. 3 is a cross-sectional view showing a housing of the detector consisting of an upper casing and a lower casing.

As shown in FIG. 3, the housing 11 is composed of an upper casing 15 including a housing cover 14 and a lower casing 13. The pump 30, the motor 31 and the switching valve 40 are contained in the housing 11. As shown in FIG. 1, the housing 11 forms therein a pump chamber 16 for containing the pump 30 and the motor 31, and a chamber 17 for containing the switching valve 40. The housing 11 has a tank port 19 forming a tank passage 18 and an atmospheric port 21 for forming an atmospheric passage 20. The tank port 19 and the atmospheric port 21 is formed in the lower casing 13. The tank passage 18 communicates with the fuel tank 2 through the canister 3 and a passage 6, as shown in FIG. 2. The atmospheric passage 20 is open to the atmosphere through an air filter 7 at its one end which is opposite to the other end connected to the detector 10.

As shown in FIG. 1, the housing 11 forms a connecting passage 22, an orifice portion 60 and an outlet passage 23. The connecting passage 22 connects the tank passage 18 and the atmospheric passage 20. An orifice passage 61 is formed in an orifice portion 60. The orifice portion 60 has an orifice 62 at its one end. The outlet passage 23 connects an outlet port 32 of the pump 30 and the atmospheric passage 20. The outlet passage 23 is formed in the pump chamber 16 between the pump 30 and the housing 11 and in the switching valve chamber 17 between the switching valve 40 and the housing 11. Air delivered from the outlet port 32 of the pump 30 flows into a space (not shown) formed between the switching valve 40 and the housing 11 through a space 81 between the pump 30 and the housing 11 and a space 82 between the motor 31 and the housing 11. Then, the air is exhausted to the atmospheric passage 20.

The orifice 62 disposed in the orifice passage 61 has an opening that corresponds to an allowable amount of leakage from the fuel tank. The leakage is a mixture of evaporated fuel and air. For example, an amount of leakage from an opening corresponding to a diameter of 0.5 mm has to be detected under the standards of CARB and EPA. Therefore, in this embodiment, the orifice 62 has an opening corresponding to a diameter of less than 0.5 mm. As shown in FIG. 1, the orifice passage 61 extends in a direction inclined with respect to a centerline of the tank passage 18. A distance between the orifice passage 61 and the centerline of the tank passage 18 increases as the tank passage 18 goes apart from the fuel tank 2.

The lower casing 13 has a cylindrical portion 63 standing from the orifice portion 60 along the centerline of the tank passage 18. The cylindrical portion 63 forms an inner passage 64 that extends in the direction parallel to the centerline of the tank passage 18. The tank port 19 forming the tank passage 18 therein and the cylindrical portion 63 forming the inner passage 64 therein form a double pipe structure.

The sensor chamber 24 is formed between the upper casing 15 and the housing cover 14. A pressure sensor 12 for detecting the pressure is disposed in the sensor chamber 24. The pressure sensor 12 outputs electrical signals representing the detected pressures to an electronic control unit (ECU) 5. The upper casing 15 has a cylindrical portion 25 forming a sensor passage 26 communicating with the sensor chamber 24. As shown in FIG. 3, the other end of the cylindrical portion 25 opposite to the one end communicating with the sensor chamber 24 is inserted into a depressed portion 27 formed in the lower casing 13. The depressed portion 27 communicates with the orifice passage 61. The sensor passage 26 is connected to the orifice passage 61 by inserting the cylindrical portion 25 of the upper casing 15 into the depressed portion 27 of the closer casing 13.

The cylindrical portion 25 extends substantially parallel to the centerline of the tank passage 18. A certain angle is formed between the orifice passage 61 and the sensor passage 26. That is, the orifice passage 61 is inclined relative to the sensor passage 26, as shown in FIG. 1. The angle formed between the orifice passage 61 and the sensor passage 26 is an obtuse angle, i.e., an angle larger than 90° and smaller than 180°. A pressure loss in the passage from the orifice 62 to the sensor chamber 24 is suppressed in this manner, and a pressure difference between a neighborhood of the orifice 62 and the sensor chamber 24 can be made small.

The upper casing 15 has a branch 28 branching out from the cylindrical portion 25. The branch 28 is cylinder-shaped and forms a pump passage 29 therein. The pump passage 29 extends in a direction perpendicular to the sensor passage 26. The pump passage 29 connects an inlet port 33 of the pump 30 to the sensor passage 26. Thus, the inlet port 33 communicates with the orifice passage 61 through the pump passage 29 and the sensor passage 26.

The pump 30 having the inlet port 33 and the outlet port 32 is disposed in the pump chamber 16. The inlet port 33 is open to the pump passage 29, while the outlet port 32 is open to the outlet passage 23. A filter 34 for removing foreign particles included in the inlet air is disposed at the inlet port 33. A one-way valve may be disposed at the inlet port 33 together with the filter 34 to prevent evaporated fuel from flowing into the pump 30 when the pump is not operating. The pump 30 includes a pump housing 35, a pump casing 36 and a pump cover 37. A rotor 38 having vanes 39 is disposed in the housing 35. When the rotor 38 rotates, air is sucked from the inlet port 33 and exhausted from the outlet port 32. The pressure in the fuel tank 2 is decreased through the canister 3 according to operation of the pump 30.

The pump 30 is driven by a brushless DC motor 31 having a motor shaft 311 to which the rotor 38 of the pump 30 is connected. The motor 31 may be replaced with other motors such as a DC motor having brushes or an AC motor. The motor 31 is driven at a predetermined speed by power supplied through a control circuit 312.

The switching valve 40 is composed of a valve body 41 disposed in the valve chamber 17, a valve shaft 42 and an electromagnetic driver 43. The switching valve 40 has a valve 44 and a reference valve 45. The valve 44 is composed of a first valve seat 441 formed on the valve body 41 and a washer 442 connected to the valve shaft 42. The reference valve 45 is composed of a second valve seat 451 formed on the cylindrical portion 63 of the housing 11 and valve gap 452 connected to the valve shaft 42. The valve shaft 42 is driven by the electromagnetic driver 43. The washer 442 is connected to a middle portion of the valve shaft 42, and the valve gap 452 is connected to the end of the valve shaft 42. The valve shaft 42 is biased by a spring 46 in a direction for pushing down the valve shaft 42 toward the second valve seat 451.

The electromagnetic driver 43 is composed of a coil 47, a stationary core 48 and a movable core 49 connected to the valve shaft 42. When the coil 47 is not energized, the valve shaft 42 is pushed down by a biasing force of the spring 46, and thereby the valve gap 452 is seated on the second valve seat 451. As a result, a passage from the tank passage 18 to the inner passage 64 through the connecting passage 22 is closed. On the other hand, the washer 442 is apart from the first valve seat 441. As a result, the tank passage 18 communicates with the atmospheric passage 20 through the connecting passage 22. Accordingly, when the coil 47 is not energized, the airflow between the tank passage 18 and the inner passage 64 is interrupted, while the airflow between the tank passage 18 and the orifice passage 61 is permitted only through the orifice 62.

When the coil 47 is energized, the movable core 49 is attracted to the stationary core 48. The valve shaft 42 connected to the movable core 49 is driven upward against the biasing force of the spring 46. The valve gap 452 is lifted from the second valve seat 451, while the washer 442 is seated on the first valve seat 441. As a result, the tank passage 18 communicates with the orifice passage 61 through the connecting passage 22, and communication between the tank passage 18 and the atmospheric passage 20 is interrupted. Accordingly, when the coil 47 is energized, the airflow between the tank passage 18 and the orifice passage 61 is allowed, and the airflow between the tank passage 18 and the atmospheric passage 20 is interrupted. The airflow between the tank passage 18 and the orifice passage 61 through the orifice 62 is always permitted not depending on whether the coil 47 is energized or not.

The canister 3 shown in FIG. 2 is filled with absorbent such as activated carbon or silica gel. The absorbent absorbs fuel evaporated in the fuel tank 2. The canister 3 is disposed between the fuel tank 2 and the detector 10. The canister 3 is connected to the detector 10 through the tank passage 18, and to the fuel tank 2 through the passage 6. Further, the canister 3 is connected to an air-intake pipe 92 of an air-intake device 4 through a purge valve 94 disposed in a purge passage 90.

Fuel vapor generated in the fuel tank 2 is absorbed to the absorbent in the canister 3. Therefore, a density of fuel vapor included in air flowing out from the canister 3 becomes lower. The evaporated fuel in the canister 3 is purged into an air-intake passage 91 in the air-intake pipe 92 when a throttle valve 93 is open under the condition that the purge valve 94 is open based on a command signal from the ECU 5.

A pressure in the sensor chamber 24 is detected by the pressure sensor 12 disposed in the sensor chamber 24. The sensor chamber 24 communicates with the orifice passage 61 and the pump passage 29 through the sensor passage 26, as shown in FIG. 1. Therefore, the pressure detected in the sensor chamber 24 is substantially equal to the pressure in the orifice passage 61 and the pump passage 29. Since the orifice passage 61 is connected to the sensor passage 26 with the obtuse angle, as mentioned above, a pressure loss in those passages is small, and a pressure difference between the sensor chamber 24 and the orifice passage 61 becomes small. The sensor chamber 24 is far apart from the pump 30 through the passage, consisting of the sensor passage 26 and the pump passage 29, having a relatively large volume. Therefore, the pressure in the sensor chamber 24 is not much affected by pressure deviation due to operation of the pump 30.

The ECU 5 is constituted by a known microcomputer including CPU, ROM and RAM. The ECU 5 controls operation of electronic systems mounted on the vehicle including the detector 10 according to signals fed from various sensors including the pressure sensor 12. The ECU 5 performs various control programs stored in the ROM. The motor 31 and the switching valve 40 of the detector 10 are also controlled by the ECU 5.

Figure 4:
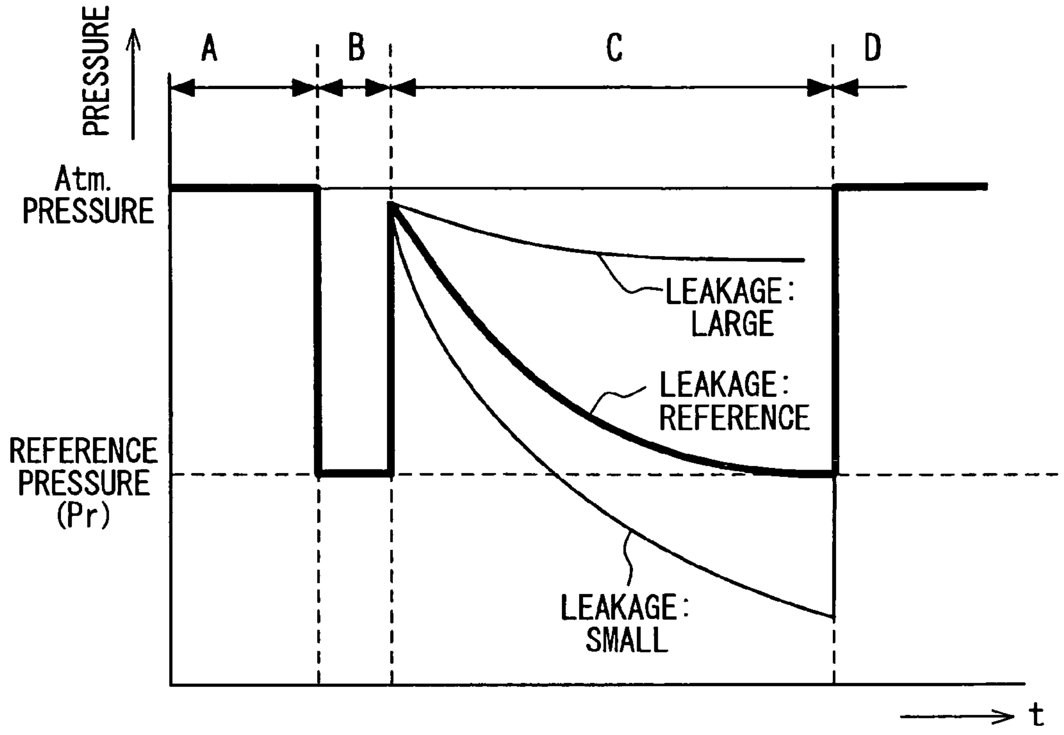
FIG. 4 is a graph showing changes in the detected pressure in a sensor chamber during various periods including a detecting period.

Now, operation of the system 1 for detecting evaporated fuel leakage from a fuel tank will be explained. A process of detecting the leakage from the fuel tank 2 is commenced when a predetermined period has lapsed after operation of the engine is stopped. The predetermined period is such a period that is required for stabilizing a temperature of the vehicle. During a period in which the engine is operated and the predetermined period after the engine is stopped, the process of detecting the leakage is not performed. In such a period in which the detecting process is not carried out, the coil 47 is not energized, and the tank passage 18 communicates with the atmospheric passage 20 through the connecting passage 22. The air including evaporated fuel in the fuel tank 2 is exhausted to the atmosphere through the open end of the atmospheric passage 20 after the evaporated fuel is absorbed in the canister 3. When the engine is not operated, the purge passage 90 is closed by the purge valve 94. The process of the leakage detection is performed in the following sequence, as shown in FIG. 4.

(1) When the predetermined period has lapsed after operation of the engine is stopped, an atmospheric pressure is detected. Since the leakage is detected based on pressure changes in a passage connected to the fuel tank 2 in this embodiment, it is necessary to minimize an influence of the atmospheric pressure which varies according to an altitude at which the detection is performed. Therefore, the atmospheric pressure is measured before the leakage detection is performed. The atmospheric pressure is detected by the pressure sensor 12 disposed in the sensor chamber 24 of the detector 10. The pressure in the sensor chamber 24 is substantially the same as the atmospheric pressure, when the coil 47 is not energized, because the sensor chamber 24 communicates with the atmosphere through the sensor passage 26, the orifice passage 61, the orifice 62, the connecting passage 22 and the atmospheric passage 20. In this stage, only the pressure sensor 12 is turned on while the motor 31 and the switching valve 40 are turned off. The atmospheric pressure detected by the pressure sensor 12 is fed to the ECU 5. The period "A" shown in FIG. 4 is referred to as an atmospheric pressure detecting period.

(2) Based on the detected atmospheric pressure, an altitude at the present position is calculated. The altitude is calculated from a map showing a relation between the altitude and the atmospheric pressure. The map is stored in the ECU 5, and parameters, which are necessary for performing the leakage detection, are adjusted based on the altitude and set in the ECU 5.

(3) Then, the pump 30 is driven by the motor 31. Air introduced into the tank passage 18 from the atmospheric passage 20 and air including evaporated fuel introduced from the fuel tank 2 through the canister 3 are sucked by the pump 30 through the orifice 62, the orifice passage 61 and the sensor passage 26. Since an amount of the air sucked by the pump 30 is restricted by the orifice 62, the pressure in the sensor chamber 24 is decreased to a predetermined reference level Pr, as shown in FIG. 4. This period in which the pressure in the sensor chamber 24 is decreased to a constant level Pr is referred to as a reference pressure detecting period "B". At the end of the period "B", the pump 30 is stopped and the detected reference pressure Pr is memorized in the RAM contained in the ECU 5.

(4) Then, a leakage detecting period "C" starts by energizing the coil 47. Upon energizing the coil 47, the washer 44 sits on the first valve seat 441 and the valve gap 452 is lifted from the second valve seat 451. The tank passage 18 is interrupted from the atmospheric passage 20 while the tank passage 18 communicates with the inner passage 64. Upon establishing communication between the tank passage 18 and the inner passage 64, the fuel tank 2 communicates with the pump passage 29 through the inner passage 64, the orifice passage 61 and the sensor passage 26. Accordingly, the pressure in the pump passage 29 becomes equal to the pressure in the fuel tank and increases to a level shown in FIG. 4 (at the beginning of period "C").

At this point, the pump 30 is again driven to suck the air in the fuel tank 2 through the pump passage 29. The pressure in the fuel tank 2, which is measured by the pressure sensor 12, decreases in response to the operation of the pump 30 as shown in FIG. 4. If the leakage is large, the pressure in the fuel tank 2 decreases only a little as shown by an upper curve in FIG. 4. If the leakage is small, the pressure sharply decreases beyond the level of reference pressure Pr as shown by the lower curve in FIG. 4. It is determined that air-tightness of the fuel tank 2 is appropriate if the pressure decreases at least to the level of reference pressure Pr as shown by the middle curve in FIG. 4.

The air-tightness or the leakage of the fuel tank 2 is detected based on the degree of the pressure decrease in the fuel tank because the pressure in the fuel tank 2 does not decrease if leaked air is introduced into the fuel tank according to the operation of the pump 30. If the air-tightness of the fuel tank 2 is not sufficient, the evaporated fuel in the fuel tank 2 leaks out from the fuel tank 2. When the leakage test shows that the leakage exceeds a permissible level, a warning lamp on a dashboard is lit to notify the drive of the defect in the fuel tank 2.

(5) When the leakage detection is completed at "D" (the end of detecting period), the switching valve 40 returns to its original position and the pump 30 is stopped. The pressure detected by the pressure sensor 12 returns to the atmospheric pressure. When the detected pressure returns to the atmospheric pressure, the pressure sensor 12 is turned off, and the detecting process is fully completed.

Advantages attained in the embodiment described above will be summarized below. The orifice portion 60, at one end of which the orifice 62 is disposed, is slanted with respect to the tank passage 18. Therefore, it is difficult to directly watch the orifice 62 from the end of the tank passage 18. Accordingly, it is difficult to change or modify the opening of the orifice 62, and temptation to do the same is suppressed. Thus, the change of the orifice 62 by an unauthorized person can be avoided.

Since the orifice passage 61 formed in the orifice portion 60 is slanted with respect to the tank passage 18, a distance from the orifice 62 to the sensor chamber 24 can be made short. Since the orifice passage 61 is connected to the sensor passage 26 at an obtuse angle, a pressure loss in the passage from the orifice 62 to the sensor chamber 24 is decreased. Therefore, a small pressure deviations or changes in the vicinity of the orifice 62 can be detected with a high accuracy.

Since the orifice portion 60 is slanted with respect to the tank passage 18, it is not necessary to provide a passage at a position opposite to the motor 31 of the pump 30. Accordingly, the housing 11 can be made small in size, and the detector 10 can be made compact. Since the orifice passage 61 is directly connected to the sensor passage 26 at its one end opposite to the other end where the orifice 62 is located, it is not necessary to close the one end of the orifice passage 61 with a closing member. Therefore, the number of parts constituting the detector 10 can be made less, and its structure can be simplified. Further, since there is no need to form a passage in the direction perpendicular to the tank passage 18, the structure of the lower casing 13 can be made simple. Accordingly, the lower casing 13 can be manufactured with a simplified die. In particular, when the lower casing 13 is molded with a resin material, the process of molding can be simplified.

While the present invention has been shown and described with reference to the foregoing preferred embodiment, it will be apparent to those skilled in the art that changes in form and detail may be made therein without departing from the scope of the invention as defined in the appended claims.

What is claimed is:

1. A detector for detecting evaporated fuel leakage from a fuel tank, the detector comprising:

a pump for pressurizing or depressurizing the fuel tank;

a pressure sensor for detecting a pressure in the fuel tank;

a housing containing the pump and the pressure sensor therein, the housing forming a tank passage connected to the fuel tank, an atmospheric passage open to the atmosphere and a sensor chamber in which the pressure sensor is disposed;

a sensor passage, formed in the housing, communicating with an inlet port of the pump and the sensor chamber, the sensor passage being substantially parallel to the tank passage;

an orifice disposed in the tank passage at a position connecting the tank passage to the fuel tank, the orifice having a reference opening which is the same as an opening permitted to the fuel tank; and an orifice passage at one end of which the orifice is positioned and at the other end of which the sensor passage is connected, the orifice passage being inclined relative to the tank passage, wherein:

the orifice passage is inclined relative to the sensor passage, making an obtuse angle between the orifice passage and the sensor passage.

2. The detector as in claim 1, wherein:

the orifice passage is formed integrally with the housing.

3. The detector as in claim 1, wherein:

the orifice passage is inclined with respect to the tank passage, in such a manner that one end of the orifice passage where the orifice is positioned is closest to a centerline of the tank passage, and the other end of the orifice passage where the sensor passage is connected is farthest from the centerline of the tank passage.

* * * * *